(12) United States Patent
Lee et al.

(10) Patent No.: US 8,917,906 B2
(45) Date of Patent: Dec. 23, 2014

(54) METHOD AND APPARATUS FOR MOTION RECOGNITION

(75) Inventors: Jun Haeng Lee, Hwaseong-si (KR); Keun Joo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 13/237,481

(22) Filed: Sep. 20, 2011

(65) Prior Publication Data

US 2012/0257789 A1      Oct. 11, 2012

(30) Foreign Application Priority Data

Apr. 6, 2011    (KR) .................. 10-2011-0031489

(51) Int. Cl.
| | | |
|---|---|---|
| *G06K 9/00* | (2006.01) | |
| *G06T 7/20* | (2006.01) | |
| *G06F 3/042* | (2006.01) | |
| *G06K 9/46* | (2006.01) | |
| *G06F 3/00* | (2006.01) | |
| *G06F 3/01* | (2006.01) | |
| *G06F 3/03* | (2006.01) | |

(52) U.S. Cl.
CPC ............ *G06T 7/2033* (2013.01); *G06F 3/0425* (2013.01); *G06K 9/00335* (2013.01); *G06K 9/4619* (2013.01); *G06K 9/4652* (2013.01); *G06F 3/005* (2013.01); *G06F 3/017* (2013.01); *G06F 3/0304* (2013.01); *G06T 2207/10016* (2013.01); *G06T 2207/10024* (2013.01); *G06T 2207/30241* (2013.01)
USPC .......................................................... 382/103

(58) Field of Classification Search
None
See application file for complete search history.

(56) References Cited

U.S. PATENT DOCUMENTS

| | | | | |
|---|---|---|---|---|
| 5,589,904 | A * | 12/1996 | Urata et al. ..................... | 396/55 |
| 6,683,432 | B2 * | 1/2004 | Griffis ..................... | 318/568.16 |
| 7,567,361 | B2 * | 7/2009 | Enmei .......................... | 358/1.15 |
| 7,728,269 | B2 * | 6/2010 | Lichtsteiner et al. ...... | 250/208.1 |
| 2005/0153722 | A1 * | 7/2005 | Chou et al. ..................... | 455/512 |
| 2006/0197664 | A1 * | 9/2006 | Zhang et al. .................. | 340/555 |
| 2006/0227997 | A1 * | 10/2006 | Au et al. ........................ | 382/103 |
| 2006/0239645 | A1 * | 10/2006 | Curtner et al. .................. | 386/95 |
| 2010/0197399 | A1 * | 8/2010 | Geiss .............................. | 463/32 |
| 2010/0277411 | A1 * | 11/2010 | Yee et al. ........................ | 345/156 |
| 2012/0177339 | A1 * | 7/2012 | Chang et al. .................. | 386/230 |
| 2014/0000921 | A1 * | 1/2014 | Vanko et al. .................... | 173/11 |

FOREIGN PATENT DOCUMENTS

| | | |
|---|---|---|
| JP | 02-144675 | 6/1990 |
| JP | 2009-104297 | 5/2009 |
| JP | 2010-123019 | 6/2010 |
| KR | 1020080029730 | 4/2008 |

(Continued)

*Primary Examiner* — Nancy Bitar
(74) *Attorney, Agent, or Firm* — NSIP Law (57) ABSTRACT

A motion recognition apparatus is provided. The motion recognition apparatus includes an event sensor configured to sense a portion of an object, where a motion occurs, and output events, a color sensor configured to photograph the object and output a color image, a motion area check unit configured to check a motion area which refers to an area where the motion occurs, using spatiotemporal correlations of the events, a shape recognition unit configured to recognize color information and shape information of an area corresponding to the motion area in the color image, a motion estimation unit configured to estimate a motion trajectory using the motion area, the color information, and the shape information, and an operation pattern determination unit configured to determine an operation pattern of the portion where the motion occurs, based on the estimated motion trajectory.

19 Claims, 8 Drawing Sheets

(56) References Cited

FOREIGN PATENT DOCUMENTS

| KR | 1020080031967 | 4/2008 |
| KR | 1020080032746 | 4/2008 |
| KR | 1020100075356 | 7/2010 |
| WO | WO 2008/012715 | 1/2008 |

* cited by examiner

Receptive field
of C(i-1, j+1)

Receptive field
of C(i, j+1)

Receptive field
of C(i+1, j+1)

Receptive field
of C(i-1, j)

Receptive field
of C(i, j)

Receptive field
of C(i+1, j)

Receptive field
of C(i-1, j-1)

Receptive field
of C(i, j-1)

Receptive field
of C(i+1, j-1)

METHOD AND APPARATUS FOR MOTION RECOGNITION

CROSS-REFERENCE TO RELATED APPLICATION(S)

This application claims the benefit under 35 U.S.C. §119 (a) of Korean Patent Application No. 10-2011-0031489, filed on Apr. 6, 2011, in the Korean Intellectual Property Office, the entire disclosure of which is incorporated herein by reference for all purposes.

BACKGROUND

1. Field

The following description relates to a method and apparatus for motion recognition.

2. Description of Related Art

User interfaces for interaction between users and electronic devices include a keyboard, a mouse, a touch panel, and the like. For example, according to a touch technology applied to the touch panel, a user may touch a screen to operate the interface. However, the screen of the touch panel may be damaged as the number of touches increases. Also, the user may feel unpleasant to directly touch the screen as the screen may be unhygienic. Accordingly, there is a need for an intuitive interface technology which has an improved natural interaction between users and electronic devices

SUMMARY

According to an aspect, a motion recognition apparatus is provided. The motion recognition apparatus includes an event sensor configured to sense a portion of an object, where a motion occurs, and output events, a color sensor configured to photograph the object and output a color image, a motion area check unit configured to check a motion area which refers to an area where the motion occurs, using spatiotemporal correlations of the events, a shape recognition unit configured to recognize color information and shape information of an area corresponding to the motion area in the color image, a motion estimation unit configured to estimate a motion trajectory using the motion area, the color information, and the shape information, and an operation pattern determination unit configured to determine an operation pattern of the portion where the motion occurs, based on the estimated motion trajectory.

The operation pattern determination unit may consider the color information, the shape information, or a combination thereof in response to determining the operation pattern of the portion where the motion occurs based on the estimated motion trajectory.

The event sensor may include a plurality of sensing units and, among the plurality of sensing units, target sensing units, which correspond to the portion where the motion occurs, output the events.

The motion area check unit may include a plurality of spatiotemporal correlators to calculate spatiotemporal correlations among the target sensing units, using the events being input from the target sensing units, and a grouping unit to check the motion area where the motion occurs, using degrees of the spatiotemporal correlations respectively calculated.

The plurality of spatiotemporal correlators each may have an internal state value indicating the spatiotemporal correlation, and may determine the degree of the spatiotemporal correlation by increasing the internal state value in response to the events being input and comparing the increased internal state value with a predetermined threshold value.

The grouping unit may generate a cluster, the cluster corresponding to the motion area, by grouping spatiotemporal correlators having a relatively high spatiotemporal correlation among the plurality of spatiotemporal correlators, and the motion trajectory estimation unit determines whether motions in the motion area and a previously-checked motion area are of the same object using the color information and the shape information of the motion area, and estimates the motion trajectory by connecting a center of the generated cluster and a center of a previously-calculated cluster in response to the motions being of the same object.

The plurality of spatiotemporal correlators may be mapped according to divided areas of the event sensor, respectively, and the divided areas may be overlapped with at least one peripheral area.

The motion recognition apparatus may further include an interface unit configured to identify an input signal of a user by referring to the determined operation pattern.

As another aspect, a motion recognition method is provided. The motion recognition method includes sensing a portion of an object being photographed by an event sensor, the portion where a motion occurs, and outputting events, photographing the object by a color sensor and outputting a color image, checking color information and shape information of an area corresponding to the motion area in the color image, estimating a motion trajectory using the motion area, the color information, and the shape information, and determining an operation pattern of the portion where the motion occurs, based on the estimated motion trajectory.

The determining of the operation pattern may determine the operation pattern of the portion where the motion occurs based on the estimated motion trajectory, by further considering the color information, the shape information, or a combination thereof.

The event sensor may include a plurality of sensing units and, among the plurality of sensing units, target sensing units, which correspond to the portion where the motion occurs, output the events.

The checking of the motion area may include calculating spatiotemporal correlations among the target sensing units by a plurality of spatiotemporal correlators, using the events being input from the target sensing units, and checking the motion area where the motion occurs, using degrees of the spatiotemporal correlations respectively calculated.

The plurality of spatiotemporal correlators each may have an internal state value indicating the spatiotemporal correlation, and the calculating of the spatiotemporal correlations among the target sensing units may determine the degree of the spatiotemporal correlation by increasing the internal state value in response to the events being input and comparing the increased internal state value with a predetermined threshold value.

The checking of the motion area may generate a cluster, that is, the motion area, by grouping spatiotemporal correlators having a relatively high spatiotemporal correlation among the plurality of spatiotemporal correlators, and the estimating of the motion trajectory may determine whether motions in the motion area and a previously-checked motion area are of the same object using the color information and the shape information of the motion area, and estimate the motion trajectory by connecting a center of the generated cluster and a center of a previously-calculated cluster in response to the motions being of the same object.

The plurality of spatiotemporal correlators may be mapped according to divided areas of the event sensor, respectively, and the divided areas may be overlapped with at least one peripheral area.

The motion recognition method may further include identifying an input signal of a user by referring to the determined operation pattern.

As another aspect, a motion recognition apparatus detecting an input of operation by a user is provided. The motion recognition apparatus includes an event sensor configured to sense a portion of an object, the portion where a motion occurs, and output events, a color sensor configured to photograph the object and output a color image, and at least one processor configured to check a motion area which refers to an area where the motion occurs, using spatiotemporal correlations of the events, to recognize color information and shape information of an area corresponding to the motion area in the color image, to estimate a motion trajectory using the motion area, the color information, and the shape information, to determine an operation pattern of the portion where the motion occurs, based on the estimated motion trajectory, and to identify an input signal of a user by referring to the determined operation pattern.

The motion area check unit may determine the motion based on a density of events.

In another aspect, a device is provided. The device includes a motion recognition unit including an event sensor configured to output events corresponding with a portion of an object, a motion area check unit configured to check a motion area using spatiotemporal correlations of the events, a shape recognition unit configured to recognize color information to and shape information of an area corresponding to the motion area, a motion estimation unit configured to estimate a motion trajectory using the motion area, the color information, and the shape information, and an operation pattern determination unit configured to determine an operation pattern of the portion where the motion occurs, based on the estimated motion trajectory.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
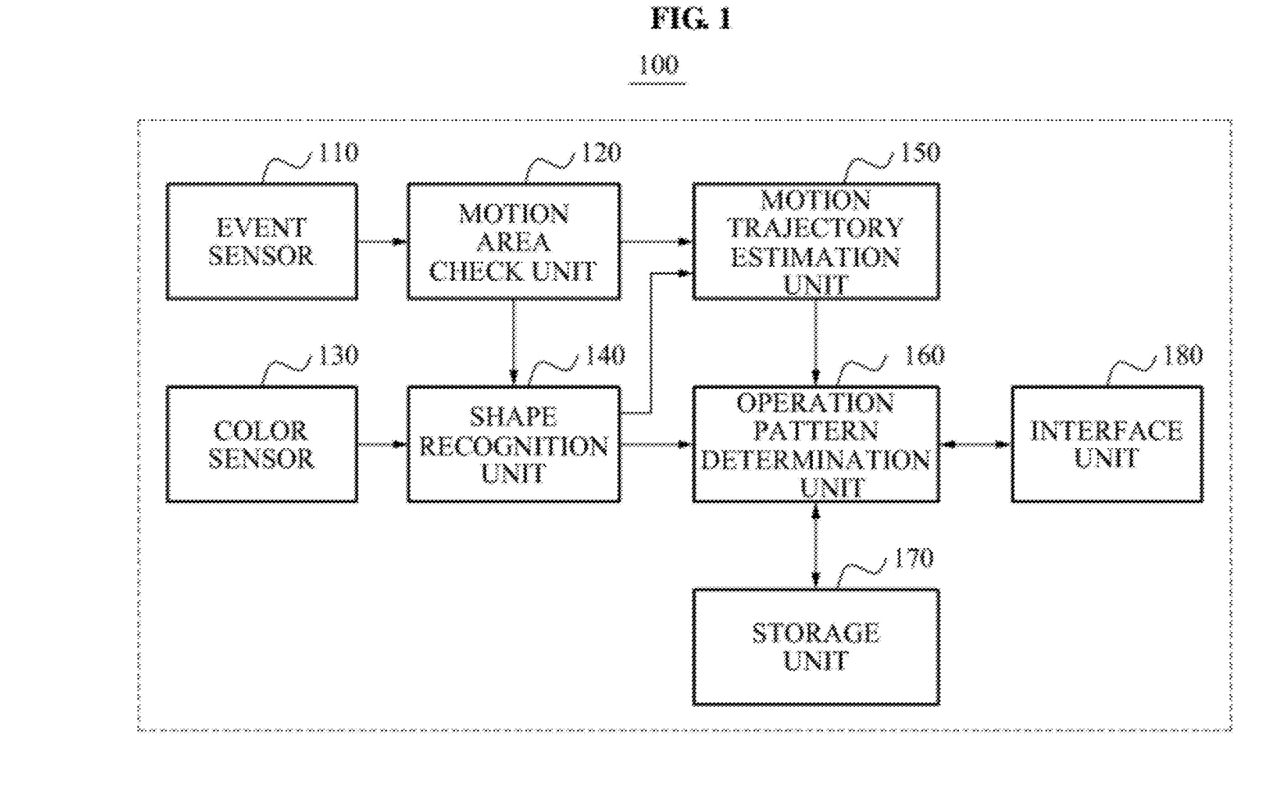
FIG. 1 is a diagram illustrating an example of a motion recognition apparatus.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. FIG. 1 illustrates an example of a motion recognition apparatus 100.

Referring to FIG. 1, the motion recognition apparatus 100 that recognizes an operation pattern according to a motion of an object includes an event sensor 110, a motion area check unit 120, a color sensor 130, a shape recognition unit 140, a motion trajectory estimation unit 150, an operation pattern determination unit 160, a storage unit 170, and an interface unit 180.

Figure 3:
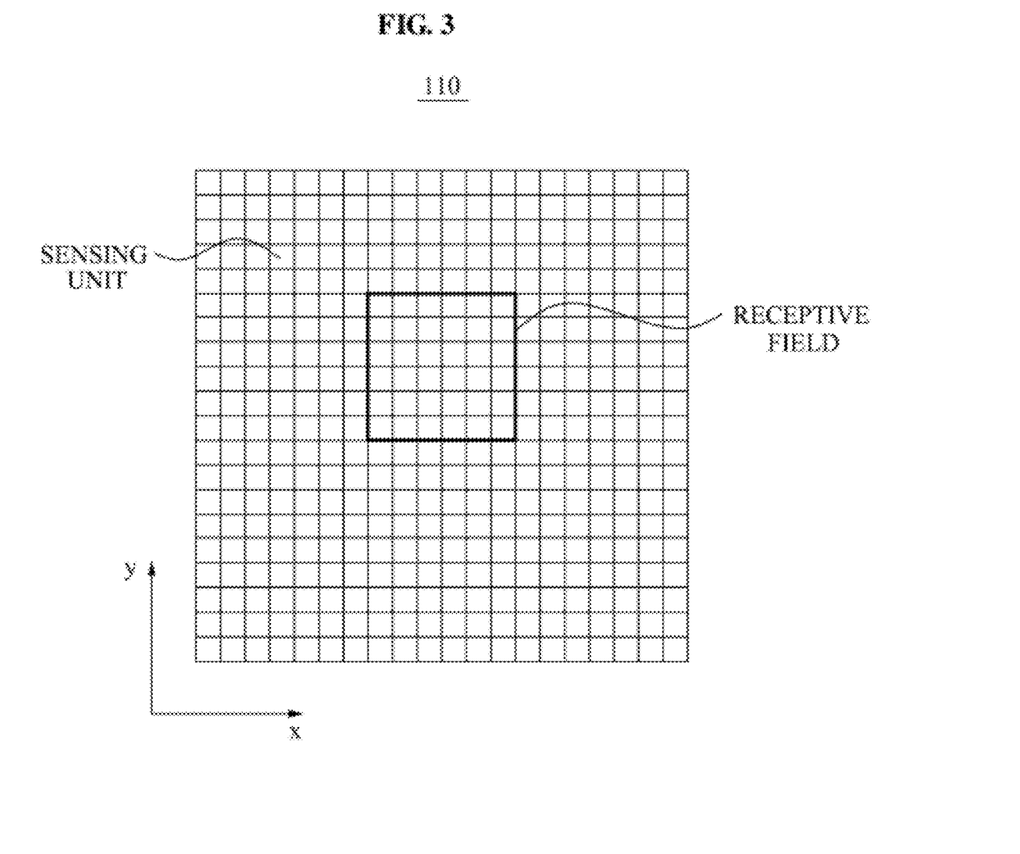
FIG. 3 is a diagram illustrating an example of an array of sensing units constituting an event sensor and a receptive field.

The event sensor 110 relates to an image sensor that senses a portion of the object, the portion where a motion occurs, and accordingly outputs events. The object may be various movable things such as, for example, a person, an animal, a robot, and the like. As shown in FIG. 3, the event sensor 110 includes an array of a plurality of sensing units. The sensing units may be provided for each pixel of an image. For example, the sensing units may be in a 60×60 array.

The sensing units may be light receiving elements. As the object wholly or partially moves, light intensity sensed by the sensing units of the event sensor 110 is varied. In the event sensor 110, target sensing units that sense variation of the light intensity output events. Also, among the plurality of sensing units, the target sensing units corresponding to the portion where the motion occurs output the events. In other words, the target sensing units refer to sensing units that output events.

The event includes information on an event occurrence time, a position of the sensing unit that outputs the event, polarity, and the like. In this example, the polarity becomes 'on' in response to an event occurring due to an increase in the intensity of light received by the sensing units. In response to an event occurring due to a decrease in the light intensity, the polarity becomes 'off.' The respective sensing units may output the events in response to a variation of the light intensity being greater than or equal to a predetermined reference value.

The color sensor 130 may be an image sensor that outputs a color image of the object.

The event sensor 110 and the color sensor 130 may be included in a single photographing unit (not shown) or in separate photographing units (not shown).

For example, the photographing unit (not shown) may be a camera capable of photographing an object in the form of a moving image or a still image. The photographing unit (not shown) may include an optical system (not shown) equipped with at least one lens, and may further include the event sensor 110 or the color sensor 130.

The motion area check unit 120 may check a motion area where the motion occurs, using spatiotemporal correlations among the events being output from the event sensor 110.

Figure 2:
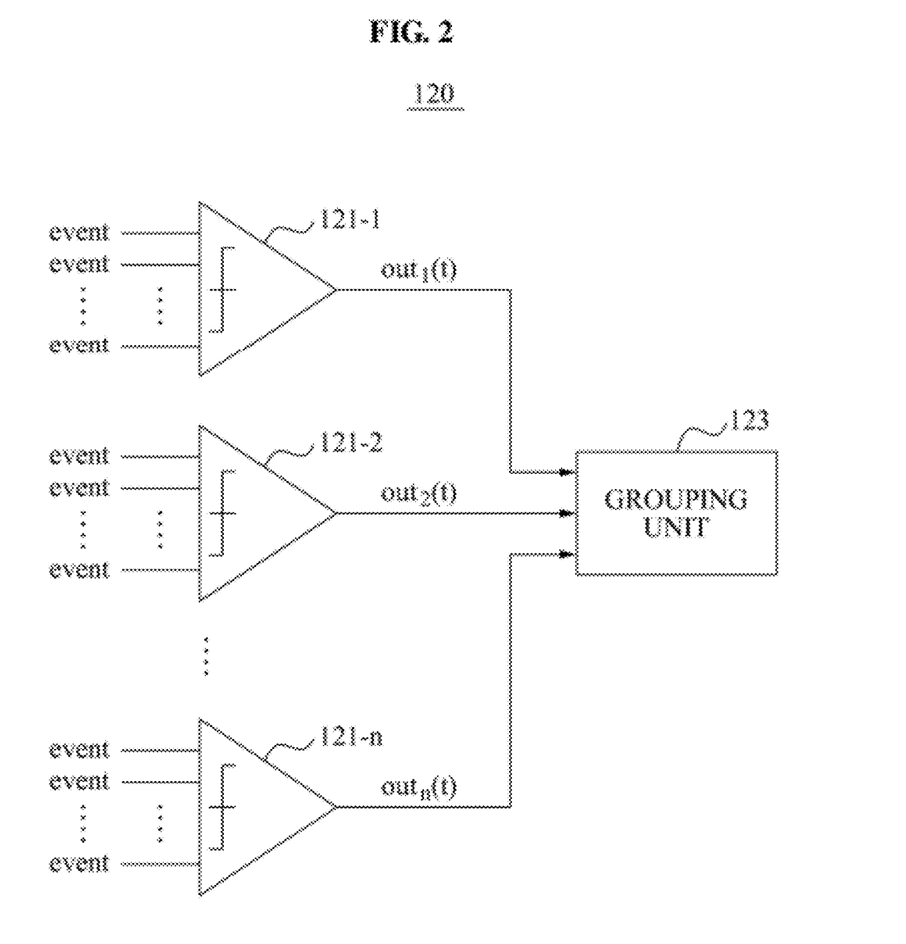
FIG. 2 is a diagram illustrating an example of a motion estimation check unit.

FIG. 2 is a diagram illustrating an example of a motion estimation check unit 120.

Referring to FIG. 2, the motion estimation check unit 120 may include a first spatiotemporal correlator to an n-th spatiotemporal correlator 121-1, 121-2 . . . 121-$n$ (n: positive number) and a grouping unit 123.

The first spatiotemporal correlator to the n-th spatiotemporal correlator 121-1, 121-2 . . . 121-$n$ may calculate spatiotemporal correlations among the respective target sensing units, using the events input from the target sensing units.

Herein, a receptive field will be described with reference to FIG. 3, to describe a spatiotemporal correlation. The first spatiotemporal correlator 121-1 is referenced as an example.

FIG. 3 is a diagram illustrating an example of an array of sensing units constituting an event sensor and a receptive field.

Referring to FIG. 3, the first spatiotemporal correlator 121-1 is input with events output from the sensing units of the event sensor 110, the sensing units forming a specific area. In this example, the specific area is the receptive field that refers to an area occupied by the sensing units capable of outputting the events to the first spatiotemporal correlator 121-1 in an electrical connection with the first spatiotemporal correlator 121-1. The receptive field may have a size of m×m, where m is a positive number. The first spatiotemporal correlator 121-1 may be input with the event from at least one of the sensing units in the receptive field. A second spatiotemporal correlator to the n-th spatiotemporal correlators 121-2 . . . 121-n may also be input with the events in connection with the sensing units in corresponding receptive fields.

Referring to FIG. 2, each of the first spatiotemporal correlator to the n-th spatiotemporal correlator 121-1, 121-2 . . . 121-n may have an internal state value which indicates a current spatiotemporal correlation. The internal state values may all be equal or different. For example, a voltage value may be the internal state value. The internal state value may be determined by a current internal state value and a new input event. In response to the event being input, the internal state value may increase. In response to no event being input for a predetermined time, the internal state value may decrease. The decrease in the internal state value may minimize a bandwidth load of a memory that stores the internal state value.

As an example, each of the first spatiotemporal correlator to the n-th spatiotemporal correlator 121-1, 121-2 . . . 121-n increases the internal state values in response to the events being input from the corresponding sensing units of the event sensor 110, and determines a degree of the spatiotemporal correlations by comparing the increased internal state values with a predetermined threshold value. The spatiotemporal correlation refers to a temporal correlation and a spatial correlation among the events respectively input to each of the first spatiotemporal correlator to the n-th spatiotemporal correlator 121-1, 121-2, . . . , 121-n.

Equation 1 may be used to calculate an output value output from the n-th spatiotemporal correlator 121-n (n=1, 2, 3, . . . ) by the input event.

$$Q_n(t)=f(Q_n(t_{prev}),e(t))$$

$$out_n(t)=\phi Q_n(t) \quad \text{[Equation 1]}$$

In Equation 1, $Q_n(t)$ refers to an internal state value of the n-th spatiotemporal correlator 121-n at a time t, $Q_n(t_{prev})$ refers to an internal state value of the n-th spatiotemporal correlator 121-n at a previous time, that is, a current internal state value, $t_{prev}$ refers to a time in response to a latest event set occurring among previously input event sets. In addition, e(t) refers to an event set input at the time t, $out_n(t)$ refers to an output value of the n-th spatiotemporal correlator 121-n, and $\phi$ refers to a threshold value. The event set indicates simple information on the events occurring at the time t. For example, in response to three events occurring in a first time t=0, e(0)={e_1, e_2, e_3}, e_n(n=1, 2, 3, . . . ) refers to an event of an n-th target sensing unit.

In response to the event being input from one of the target sensing units of the sensing units in a corresponding receptive field at the time t, the n-th spatiotemporal correlator 121-n increases the previous internal state value $Q_n(t_{prev})$. A degree of the increase may be influenced by a weight relating to the target sensing unit that generates the event. In response to a plurality of events being substantially simultaneously input, the increase is accelerated. The weight may be set differently according to the sensing units.

The first spatiotemporal correlator to the n-th spatiotemporal correlator may output, to the grouping unit 123, respectively different output values according to degrees of the spatiotemporal correlations. In other words, in response to the internal state value $Q_n(t)$ exceeding the threshold $\phi$, the n-th spatiotemporal correlator 121-n may determine that the spatiotemporal correlations are high, the spatiotemporal correlations among the target sensing units outputting the events to the n-th spatiotemporal correlator 121-n, and accordingly output 1. In response to the internal state value $Q_n(t)$ being equal to or lower than the threshold $\phi$, the n-th spatiotemporal correlator 121-n may determine that the spatiotemporal correlations is low and accordingly output 0. As another example, 'high' or 'true' may be used instead of the output value '1' whereas 'low' or 'false' may be used instead of the output value '0.' After the n-th spatiotemporal correlator 121-n outputs '1', the internal state value of the n-th spatiotemporal correlator 121-n may be decreased by as much as a predetermined degree.

The internal state value $Q_n(t)$ calculated by the n-th spatiotemporal correlator 121-n may indicate a spatial correlation and a temporal correlation of the events input from the target sensing units to the n-th spatiotemporal correlator 121-n. For example, in response to events being consecutively input from one target sensing unit to the n-th spatiotemporal correlator 121-n, the internal state value $Q_n(t)$ may indicate the temporal correlation of the input events. In addition, in response to two events being substantially simultaneously input from two target sensing units to the n-th spatiotemporal correlator 121-n, in other words, in response to two target sensing units being approximate and connected to the same n-th spatiotemporal correlator 121-n, the two events have a spatially high correlation. In this example, the two events substantially simultaneously input from the two target sensing units also have a temporal correlation.

The first spatiotemporal correlator to the n-th spatiotemporal correlator 121-1, 121-2, . . . , 121-n may each have spatial correlations.

Figure 4:
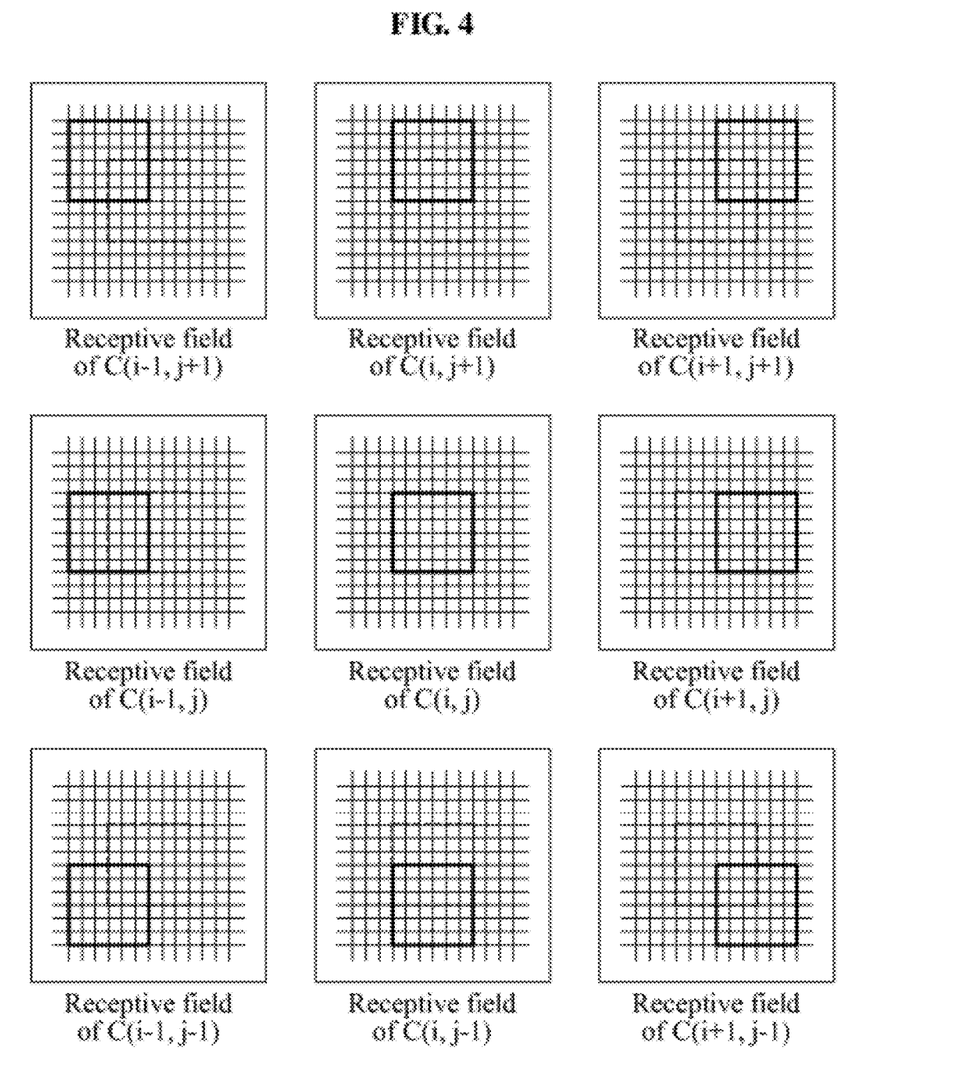
FIG. 4 is a diagram illustrating an example of spatial correlations among a first to n-th spatiotemporal correlators.

FIG. 4 is a diagram illustrating an example of spatial correlations among the first spatiotemporal correlator to the n-th spatiotemporal correlator.

Referring to FIG. 4, the event sensor 110 may be divided into a plurality of receptive fields. In the example, the receptive fields are overlapped with at least one peripheral area. The first spatiotemporal correlator to the n-th spatiotemporal correlator 121-1, 121-2 . . . 121-n may be mapped according to the divided receptive fields. The sensing units located in the respective receptive fields may output events to corresponding ones of the first spatiotemporal correlator to the n-th spatiotemporal correlator 121-1, 121-2 . . . 121-n.

In FIG. 4, C(i,j) refers to a central coordinate of a receptive field located in a center of the event sensor 110. C(i−1,j) refers to a central coordinate of a receptive field moved by '1' in an x-axis direction, that is, a horizontal direction from the central coordinate C(i,j). In the example of FIG. 4, '1' means a movement as much as 3 pixels, which is adjustable.

As shown in FIG. 4, overlap of the receptive fields means that the same event may be output to at least two spatiotemporal correlators, substantially simultaneously. Since the receptive fields share an overlapping area, the spatial correlations among the first spatiotemporal correlator to the n-th spatiotemporal correlator 121-1, 121-2, . . . , 121-*n* or the temporal correlations among the receptive fields may be assigned. The spatial correlations among the first spatiotemporal correlator to the n-th spatiotemporal correlator 121-1, 121-2 . . . 121-*n* may influence estimation of a motion trajectory.

Referring to FIG. 2, the grouping unit 123 may check the motion area, the motion area being the area where the motion occurs, through degrees of the spatiotemporal correlations, the spatiotemporal correlations being the output values of the spatiotemporal correlations calculated from the first spatiotemporal correlator to the n-th spatiotemporal correlator 121-1, 121-2, . . . , 121-*n*.

The grouping unit 123 may generate one cluster by grouping spatiotemporal correlators having relatively high spatiotemporal correlations among the first spatiotemporal correlator to the n-th spatiotemporal correlator 121-1, 121-2, . . . , 121-*n*. As an example, the grouping unit 123 may group spatiotemporal correlators that output '1' among the first to n-th spatiotemporal correlators 121-1, 121-2, . . . , 121-*n*, based on the overlap of the receptive fields. In other words, the grouping unit 123 generates one cluster by grouping the overlapping spatiotemporal correlators. In this example, the output value '1' means a high spatiotemporal correlation.

Figure 5:
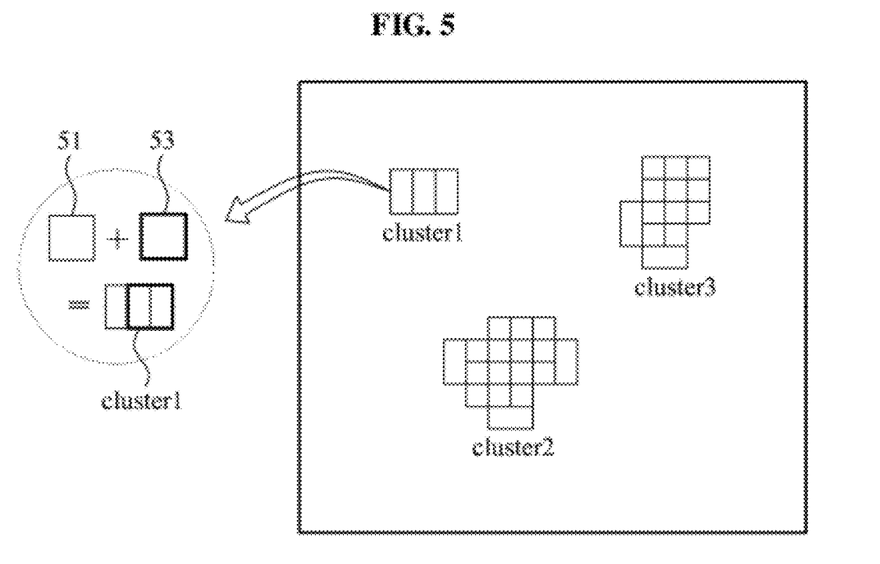
FIG. 5 is a diagram illustrating an example of first to third clusters generated by grouping the first to n-th spatiotemporal correlators.

FIG. 5 is a diagram illustrating an example of first to third clusters (cluster n, n=1, 2, 3) generated by grouping the first spatiotemporal correlator to the n-th spatiotemporal correlator 121-1, 121-2 . . . 121-*n*.

Referring to FIG. 5, a first cluster 1 is generated by grouping two receptive fields 51 and 53 overlapping each other. A second cluster 2 is generated by grouping ten receptive fields overlapping each other. A third cluster 3 is generated by grouping seven receptive fields overlapping each other.

The grouping unit 123 may recognize a position where a motion occurs, using the clusters. The clusters may have shapes corresponding to the position where the motion occurs. In other words, since the event sensor 110 outputs events from the target sensing units sensing variation of the light intensity, the position where the motion occurs may be found using the spatiotemporal correlations among the events.

The shape recognition unit 140 may check color information and shape information of an area corresponding to the motion area checked by the motion area check unit 120 from the color image output by the color sensor 130. In other words, the shape recognition unit 140 checks a color and shape of an object corresponding to the motion area.

The motion trajectory estimation unit 150 estimates a motion trajectory based on the color information and the shape information of the motion area checked by the motion area check unit 120 and the motion area checked by the shape recognition unit 140.

As another example, the motion trajectory estimation unit 150 may compare a current motion area with a previously checked motion area using the color information and the shape information. In response to motions being of the same object, the motion trajectory estimation unit 150 may estimate a motion trajectory by connecting a central position of the generated cluster, the generated cluster being the current motion area, with a central position of the calculated cluster, the calculated cluster being the previous motion area.

In response to a plurality of motions being checked by the motion area check unit 120, the motion trajectory estimation unit 150 may check a motion area corresponding to the previously checked motion area, based on the color information and the shape information of the plurality of motion areas.

The motion trajectory estimation unit 150 may multiply positions of the respective spatiotemporal correlators included in the clusters by a constant, and determine a mean of the multiplication results as the central position of the cluster. In the example, the positions of the spatiotemporal correlators may be a representative position of areas covered by the spatiotemporal correlators. The constant may include various values such as an internal state value Q(t) calculated by the spatiotemporal correlators or a number of events input to the spatiotemporal correlators during a specific time zone.

For example, a certain cluster is generated by grouping of the first spatiotemporal correlator 121-1 and the second spatiotemporal correlator 121-2 is presumed. The internal state value of the first spatiotemporal correlator 121-1 is Q1 and the internal state value of the second spatiotemporal correlator 121-2 is Q2. The representative position of the first spatiotemporal correlator 121-1 is (x1, y1) and the representative position of the second spatiotemporal correlator 121-2 is (x2, y2). In this case, the motion trajectory estimation unit 150 may calculate the central position of the cluster using Equation 2.

$$x' = \frac{(Q1 \times x1) + (Q2 \times x2)}{Q1 + Q2}$$
$$y' = \frac{(Q1 \times y1) + (Q2 \times y2)}{Q1 + Q2}$$
[Equation 2]

In Equation 2, x' refers to an x coordinate of the central position of the cluster, and y' refers to a y coordinate of the central position of the cluster.

Figure 6:
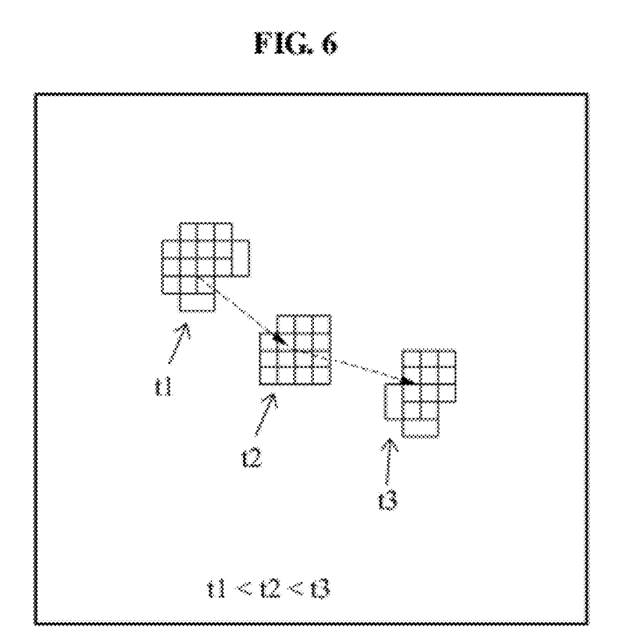
FIG. 6 is a diagram illustrating an example of estimation of a motion trajectory of a portion where a motion occurs, using the cluster.

FIG. 6 is a diagram illustrating an example of an estimation of a motion trajectory of a portion where a motion occurs, using the cluster.

The motion trajectory estimation unit 150 may calculate central positions of clusters in response to the clusters being generated by the grouping unit 123. Referring to FIG. 6, the grouping unit 123 may generate the clusters at times t1, t2, and t3. The motion trajectory estimation unit 150 may calculate central positions of the respective clusters and estimate the motion trajectory by connecting the calculated central positions. In other words, the motion trajectory of the portion where the motion occurs may be estimated through calculation of positions of the grouped spatiotemporal correlators, that is, the grouped receptive fields.

Figure 7:
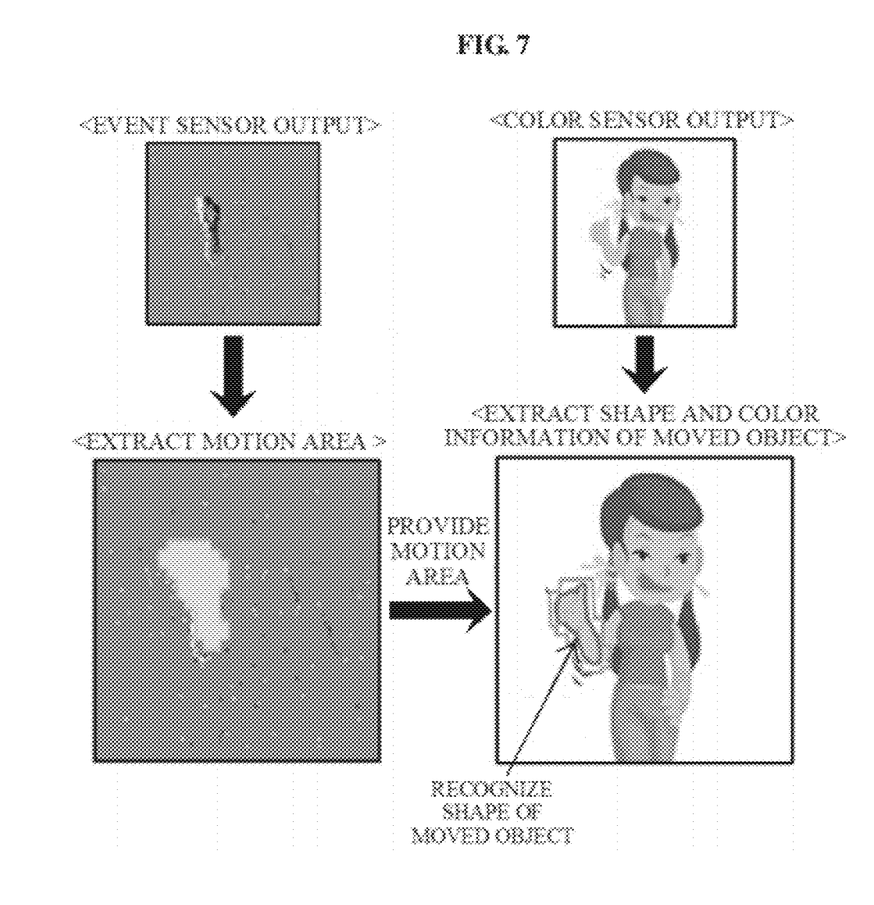
FIG. 7 is a diagram illustrating an example of serial processes of checking color information and shape information of a motion area from output events.

FIG. 7 is a diagram illustrating an example of serial processes of checking color information and shape information of a motion area from output events.

In FIG. 7, a white point refers to an event having an 'off' polarity generated by decrease in the light intensity. A black point refers to an event having an 'on' polarity generated by an increase in the light intensity. A portion where the events are dense is the portion where a motion sensed by the event sensor 110 occurs. A high density of the events refers to a large variation of the motion. The first spatiotemporal correlator to the n-th spatiotemporal correlator 121-1, 121-2 . . . 121-*n* outputs values indicating degrees of the spatiotemporal correlations using the input events. The grouping unit 123 may group spatiotemporal correlators outputting '1' as the output value among the first spatiotemporal correlator to the n-th spatiotemporal correlator 121-1, 121-2, . . . , 121-*n*, thereby generating the cluster which is the motion area.

The shape recognition unit 140 may receive the color image from the color sensor 130 and the motion area from the motion area check unit 120, thereby checking the color information and the shape information of an area corresponding to the motion area checked in the color image. In the example of FIG. 7, color information and shape information regarding a hand may be checked.

Referring back to FIG. 1, the operation pattern determination unit 160 may determine the operation pattern of the portion where the motion occurs, from the motion trajectory estimated by the motion area check unit 120.

In response to determining the operation pattern of the portion where the motion occurs based on the motion trajectory, the operation pattern determination unit 160 may further consider the color information, the shape information, or a combination thereof checked by the shape recognition unit 140.

As an example, the operation pattern determination unit 160 may acquire feature components indicating the operation pattern, from the estimated motion trajectory. In addition, the operation pattern determination unit 160 may determine the operation pattern by comparing the feature components, the color information, and the shape information with the operation pattern, the color information, and the shape information stored in the storage unit 170. The feature components may include a position, a motion direction, and a motion angle of the cluster. In addition, a body part such as a hand, foot, head, shoulder, and the like, or an object may be determined based on the color information and the shape information.

The storage unit 170 may store a plurality of feature component values and corresponding operation patterns. The storage unit 170 may also store the plurality of feature components, the color information, the shape information, and corresponding operation patterns.

The interface unit 180 may recognize an input signal of the user referring to the determined operation patterns, and may output a control command to a device (not shown) to control the device according to the input signal. The device may be installed to be communicable with the motion recognition apparatus 100 in a wired or wireless manner. As another example, the motion recognition apparatus 100 may be installed in the device.

In the example of FIG. 1, the motion recognition apparatus 100 may further include a control unit (not shown). The control unit (not shown) may control the overall operation of the motion recognition apparatus 100. In addition, the control unit may function as the motion area check unit 120, the shape recognition unit 140, the motion trajectory estimation unit 150, the operation pattern determination unit 160, the storage unit 170, and the interface unit 180. In other words, the control unit (not shown), the motion area check unit 120, the shape recognition unit 140, the motion trajectory estimation unit 150, the operation pattern determination unit 160, the storage unit 170, and the interface unit 180 are separately illustrated in FIG. 1 to describe functions of the aforementioned parts. The controller (not shown) may include at least one processor configured to perform the respective functions of the motion area check unit 120, the shape recognition unit 140, the motion trajectory estimation unit 150, the operation pattern determination unit 160, the storage unit 170, and the interface unit 180. Also, the control unit (not shown) may include at least one processor configured to perform part of the functions of the motion area check unit 120, the shape recognition unit 140, the motion trajectory estimation unit 150, the operation pattern determination unit 160, the storage unit 170, and the interface unit 180.

As a non-limiting example, the motion recognition apparatus 100 of FIG. 1 may include a single event sensor 110 and color sensor 130, respectively. As another example, the motion recognition apparatus 100 may include a plurality of event sensors 110 and color sensors 130, respectively.

Figure 8:
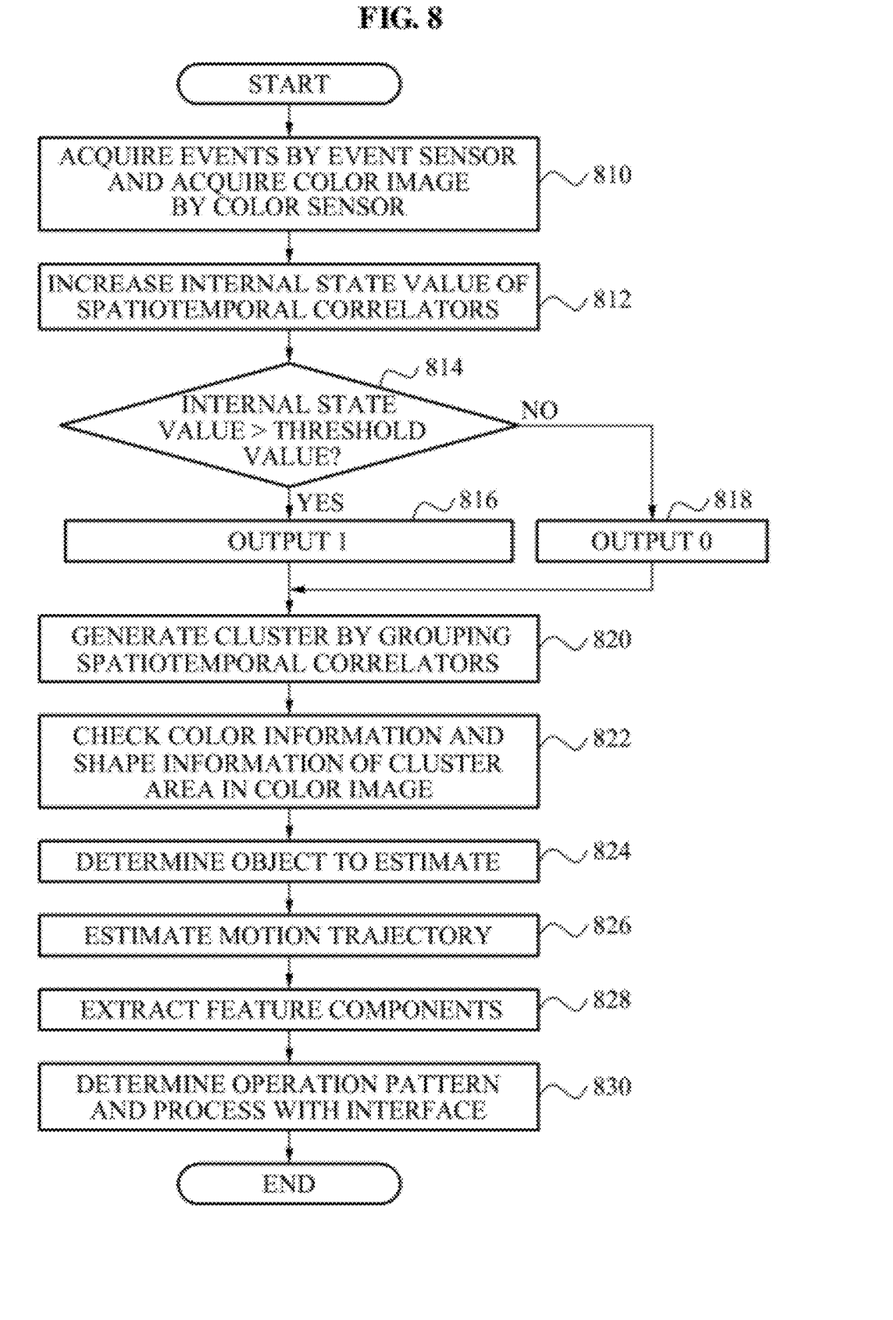
FIG. 8 is a flowchart illustrating an example of a motion recognition method of the motion recognition apparatus.

FIG. 8 is a flowchart illustrating an example of a motion recognition method of the motion recognition apparatus.

Respective operations shown in FIG. 8 may be performed by the controller (not shown) of the motion recognition apparatus 100 or the processor (not shown) explained with reference to FIG. 1.

In operation 810, while photographing an object, the motion recognition apparatus outputs events to corresponding spatiotemporal correlators by a sensing unit of an event sensor, the sensing unit corresponding to a portion where a motion occurs. In addition, the motion recognition apparatus acquires a color image through a color sensor. The motion recognition apparatus includes an image sensor including an array of a plurality of sensing units. The image sensor senses variation of light intensity and accordingly operates the sensing unit which corresponds to the portion where the motion occurs to output the events.

In operation 812, the motion recognition apparatus increases an internal state value of each of the spatiotemporal correlators, using the events being input. The internal state value may indicate the spatiotemporal correlations of the events.

In operation 814, the motion recognition apparatus compares the internal state value of each of the spatiotemporal correlators with a predetermined threshold value.

In response to the increased internal state value exceeding the predetermined threshold value as a result of comparison in operation 814, the motion recognition apparatus determines that the spatiotemporal correlation of the spatiotemporal correlator is high and therefore outputs '1' as an output value in operation 816.

In response to the increased internal state value not exceeding the predetermined threshold value in operation 814, the motion recognition apparatus determines that the spatiotemporal correlation of the spatiotemporal correlator is low and therefore outputs '0' as an output value in operation 818.

In operation 820, the motion recognition apparatus groups spatiotemporal correlators outputting '1', thereby generating a cluster which is a motion area. In this operation, the motion recognition apparatus groups the spatiotemporal correlators which overlap their peripheral spatiotemporal correlators into one cluster.

In operation 822, the motion recognition apparatus checks color information and shape information of an area corresponding to the motion area in the color image. In other words, the motion recognition apparatus checks a color and shape of the object corresponding to the motion area.

In operation 824, using the color information and the shape information of the motion area, the motion recognition apparatus compares a current motion area with a previously check motion area to check whether motions of the motion areas are of the same object. In other words, the motion recognition apparatus determines whether the motion area corresponds to the object for estimation of a motion trajectory.

In operation 826, the motion recognition apparatus compares the current motion area with the previously checked motion area. In response to the motions being of the same object, the motion recognition apparatus estimates the motion trajectory by connecting a central position of the generated cluster, that is, the current motion area, with a central position of a previously calculated cluster, that is, a previous motion area.

In operation 828, the motion recognition apparatus extracts feature components for indicating an operation pattern, from the estimated motion trajectory.

In operation 830, the motion recognition apparatus compares the extracted feature components, the color information, and the shape information with an operation pattern, color information, and shapes information which are pre-stored, thereby determining the operation pattern of the portion where the motion occurs, and controls an operation of a device (not shown) referring to the operation pattern. The device (not shown) may be connected with the motion recognition apparatus. Alternatively, the motion recognition apparatus may be provided in the device (not shown).

According to the examples, sensing a motion by checking a motion area using an event sensor and checking color information and shape information of the motion area using a color sensor is possible. Accordingly, a motion recognition apparatus and method according to the examples may omit pre-processing of the entire image that has been necessary to recognize a moving object. Additionally, a high computing power required in a conventional motion recognition system may be unnecessary.

The motion recognition apparatus may be applied to devices utilizing various application programs, such as a TV, a computer, a game console, and the like, by replacing a conventional remote controller of the devices.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, to such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion recognition apparatus comprising:
   an event sensor configured to sense a portion of an object in motion, and output a plurality of events based on positions of target sensing units of the event sensor at which the motion is sensed, wherein the event sensor comprises a plurality of sensing units and, among the plurality of sensing units, the target sensing units, which correspond to the portion where the motion occurs, output the events;
   a color sensor configured to photograph the object and output a color image;
   a motion area check unit configured to determine a motion area which refers to an area where the motion occurs, using spatiotemporal correlations among the plurality of events, the spatiotemporal corrections being determined based on the events output from the target sensing units;
   a shape recognition unit configured to recognize color information and shape information of an area corresponding to the motion area in the color image;
   a motion estimation unit configured to estimate a motion trajectory using the motion area, the color information, and the shape information; and
   an operation pattern determination unit configured to determine an operation pattern of the portion where the motion occurs, based on the estimated motion trajectory.

2. The motion recognition apparatus of claim 1, wherein the operation pattern determination unit considers the color information, the shape information, or a combination thereof in response to determining the operation pattern of the portion where the motion occurs based on the estimated motion trajectory.

3. The motion recognition apparatus of claim wherein the motion area check unit comprises:
   a plurality of spatiotemporal correlators to calculate spatiotemporal correlations among the target sensing units, using the events being input from the target sensing units; and
   a grouping unit to check the motion area where the motion occurs, using degrees of the spatiotemporal correlations respectively calculated.

4. The motion recognition apparatus of claim 3, wherein the plurality of spatiotemporal correlators each have an internal state value indicating the spatiotemporal correlation, and determine the degree of the spatiotemporal correlation by increasing the internal state value in response to the events being input and comparing the increased internal state value with a predetermined threshold value.

5. The motion recognition apparatus of claim 3, wherein
   the grouping unit generates a cluster, the cluster corresponding to the motion area, by grouping spatiotemporal correlators having a spatiotemporal correlation above a predetermined threshold from among the plurality of spatiotemporal correlators, and
   the motion trajectory estimation unit determines whether motions in the motion area and a previously-checked motion area are of the same object using the color information and the shape information of the motion area, and estimates the motion trajectory by connecting a center of the generated cluster and a center of a previously-calculated cluster in response to the motions being of the same object.

6. The motion recognition apparatus of claim 3, wherein the plurality of spatiotemporal correlators are mapped according to divided areas of the event sensor, respectively, and the divided areas are overlapped with at least one peripheral area.

7. The motion recognition apparatus of claim 1, further comprising an interface unit configured to identify an input signal of a user by referring to the determined operation pattern.

8. A motion recognition method comprising: sensing by an event sensor a portion of an object in motion, and outputting a plurality a plurality of events based on positions of target sensing units of the event sensor at which the motion is sensed, wherein the event sensor comprises a plurality of sensing units and, among the plurality of sensing units, the target sensing units, which correspond to the portion where the motion occurs, output the events; photographing the object by a color sensor and outputting a color image; determining a motion area which refers to an area where the motion occurs, using spatiotemporal correlations among the plurality of events; the spatiotemporal correlations being determined based on the events output from the target sensing; checking color information and shape information of an area corresponding to the motion area in the color image; estimating a motion trajectory using the motion area, the color information, and the shape information; and determining an operation pattern of the portion where the motion occurs, based on the estimated motion trajectory.

9. The motion recognition method of claim 8, wherein the determining of the operation pattern determines the operation pattern of the portion where the motion occurs based on the estimated motion trajectory, by further considering the color information, the shape information, or a combination thereof.

10. The motion recognition method of claim 8, wherein the checking of the motion area comprises:
calculating spatiotemporal correlations among the target sensing units by a plurality of spatiotemporal correlators, using the events being input from the target sensing units; and
checking the motion area where the motion occurs, using degrees of the spatiotemporal correlations respectively calculated.

11. The motion recognition method of claim 10, wherein
the plurality of spatiotemporal correlators each have an internal state value indicating the spatiotemporal correlation, and
the calculating of the spatiotemporal correlations among the target sensing units determines the degree of the spatiotemporal correlation by increasing the internal state value in response to the events being input and comparing the increased internal state value with a predetermined threshold value.

12. The motion recognition method of claim 10, wherein
the checking of the motion area generates a cluster, that is, the motion area, by grouping spatiotemporal correlators having a spatiotemporal correlation above a predetermined threshold from among the plurality of spatiotemporal correlators, and
the estimating of the motion trajectory determines whether motions in the motion area and a previously-checked motion area are of the same object using the color information and the shape information of the motion area, and estimates the motion trajectory by connecting a center of the generated cluster and a center of a previously-calculated cluster in response to the motions being of the same object.

13. The motion recognition method of claim 10, wherein the plurality of spatiotemporal correlators are mapped according to divided areas of the event sensor, respectively, and the divided areas are overlapped with at least one peripheral area.

14. The motion recognition method of claim 8, further comprising identifying an input signal of a user by referring to the determined operation pattern.

15. A motion recognition apparatus detecting an input of operation by a user, the motion recognition apparatus comprising: an event sensor configured to sense a portion of an object in motion, and output a plurality of events based on positions of target sensing units of the vent sensor at which the motion is sensed, wherein the vent sensor comprises a plurality of sensing units and, among the plurality of sensing units, the target sensing units, which correspond to the portion where the motion occurs, output the events; a color sensor configured to photograph the object and output a color image;
at least one processor configured to determine a motion area which refers to an area where the motion occurs, using spatiotemporal correlations among the plurality of events, the spatiotemporal correlations being determined based on the events output from the target sensing units; to recognize color information and shape information of an area corresponding to the motion area in the color image to estimate a motion trajectory using the motion area, the color information, and the shape information, to determine an operation pattern of the portion where the motion occurs, based on the estimated motion trajectory, and to identify an input signal of a user by referring to the determined operation pattern.

16. The motion recognition apparatus of claim 1, wherein the motion area check unit determines the motion based on a density of events.

17. The motion recognition apparatus of claim 1, wherein the event sensor comprises a plurality of light sensing areas, and the motion area check unit determines the motion area based on a spatiotemporal correlation of at least two of target light sensing areas that sense the object in motion and output an event corresponding thereto.

18. The motion recognition apparatus of claim 17, wherein the at least two target light sensing areas that sense the object in motion partially overlap.

19. A motion recognition apparatus, comprising: a sensor comprising a plurality of target sensing units configured to sense light intensity of an object in motion and output a plurality of events based on positions of target sensing units of the event sensor at which the motion is sensed, wherein the event sensor comprises a plurality of sensing units and, among the plurality of sensing units, the target sensing units, which correspond to the portion where the motion occurs, output the events; a motion determiner configured to determine an area at which the object is in motion based on spatiotemporal correlations between at least two target sensing units which sense the objection in motion; the spatiotemporal correlations being determined based on the events output from the target sensing units;
a shape recognizer configured to recognize shape information of the object at the area at which the object is in motion; and a motion estimator configured to estimate a motion trajectory of the object based on the motion area and the shape information.

* * * * *